United States Patent [19]

Stephenson

[11] Patent Number: 5,196,486

[45] Date of Patent: Mar. 23, 1993

[54] ALKOXYLATED VINYL POLYMER DEMULSIFIERS

[75] Inventor: William K. Stephenson, Sugar Land, Tex.

[73] Assignee: Nalco Chemical Company, Naperville, Ill.

[21] Appl. No.: 569,626

[22] Filed: Aug. 20, 1990

Related U.S. Application Data

[62] Division of Ser. No. 325,165, Mar. 17, 1989, Pat. No. 4,968,449.

[51] Int. Cl.$^5$ .................... C08F 20/26; C08F 220/26; C08F 222/20; B01D 17/05
[52] U.S. Cl. ........................... 525/328.8; 525/330.3; 525/383; 525/385; 252/358; 252/340
[58] Field of Search ............... 252/340, 341, 342, 344, 252/345, 358, 332; 525/327.1, 327.4, 326.7, 328.8, 328.9, 329.4, 329.7, 330.3, 383, 385

[56] References Cited

U.S. PATENT DOCUMENTS

| | | | |
|---|---|---|---|
| 2,499,369 | 3/1950 | De Groote | 252/340 |
| 2,607,761 | 8/1952 | Seymour | 525/327.4 X |
| 2,806,844 | 9/1957 | Gerecht et al. | 525/328.8 X |
| 2,842,519 | 7/1958 | Ripley-Duggan | 525/329.7 X |
| 3,784,528 | 1/1974 | Pirck et al. | 525/385 |
| 4,582,628 | 4/1986 | Buriks et al. | 252/340 |
| 4,619,964 | 10/1986 | Kielbania et al. | 525/328.8 X |
| 4,626,379 | 12/1986 | Buriks et al. | 252/340 |
| 4,678,599 | 7/1987 | Fock et al. | 252/343 |
| 4,956,421 | 9/1990 | Denzinger et al. | 525/327.4 X |
| 5,084,520 | 1/1992 | Fong | 525/329.4 |

FOREIGN PATENT DOCUMENTS

| | | | |
|---|---|---|---|
| 1010740 | 5/1977 | Canada | 134/56 |
| 6400774 | 8/1965 | Netherlands | 525/330.3 |

OTHER PUBLICATIONS

"The Nalco Water Handbook", McGraw-Hill, Inc., 2nd Edition, pp. 11.1-11.18.

*Primary Examiner*—Robert L. Stoll
*Assistant Examiner*—Daniel S. Metzmaier
*Attorney, Agent, or Firm*—Ailes, Ohlandt & Greeley

[57] ABSTRACT

A process for making an alkoxylated vinyl polymer comprising the steps of vinyl polymerizing at least one hydrophobic monomer and at least one hydrophilic monomer in the presence of a initiator and at a temperature of about 70°–160° C. Alkoxylate said vinyl polymer with at least one alkylene oxide selected from the group consisting of ethylene oxide, propylene oxide, and butylene oxide wherein said alkylene oxide is present in an amount of 2 to 40%.

7 Claims, No Drawings

ALKOXYLATED VINYL POLYMER DEMULSIFIERS

This is a division, of application Ser. No. 325,165, filed Mar. 17, 1989 now U.S. Pat. No. 4,968,449.

BACKGROUND OF THE INVENTION

The present invention provides a demulsifier which is both economical and efficient for use in breaking emulsion products, especially crude oil emulsions. This unique demulsifier comprises a vinyl polymer with a site capable of being alkoxylated, and at least one alkylene oxide selected from the group consisting of ethylene oxide, propylene oxide, butylene oxide, and the like. These demulsifiers are hereinafter referred to as alkoxylated vinyl polymers.

Crude oil emulsions, which are typically of the water-in-oil (w/o) variety, are formed when oil, water, and emulsifying agents (natural and man-made) are mixed together. The production process supplies adequate energy for the emulsification of crude oil.

Water-in-oil emulsions can be broken by chemical or physical methods, including heating, centrifugation and vacuum precoat filtration. Centrifugation breaks oil emulsions by separating oil and water phases under the influence of centrifugal force. Filtration of waste oil emulsions can be accomplished through high rate sand filters or diatomaceous earth filters. Chemical treatment of waste oil emulsion is directed toward destabilizing the dispersed water droplets and solids or destroying emulsifying agents. Acidification may be effective in breaking water-in-oil emulsions if the acid dissolves some of the solid material and thus reduces surface tension.

Recent techniques involve treatment of water-in-oil emulsions with a demulsifying agent containing both hydrophobic and hydrophilic groups that is able to form a water wettable adsorption complex. Because water droplets in oil tend to be positively charged, these types of emulsions are typically treated with an anionic (negative charge) organic emulsion breaker. Sometimes a combination of acid and organic emulsifying agents provide the best results.

Lately, several vinyl polymers demonstrated some potential as demulsifiers. Vinyl polymers offer potential advantages over conventional emulsion breakers. That is, manufacturing costs for vinyl polymers should be lower than that of traditional emulsion breakers, such as resin and alkoxylates. With the recent escalation in the price of ethylene oxide and potential for future price hikes, there is tremendous interest in the development of emulsion breakers which do not contain ethylene or propylene oxide. Unlike alkoxylation, vinyl polymerization does not require the use of a special reaction vessel. Important safety advantages are also associated with the formation of demulsifier intermediates which do not require the use of hazardous oxides.

The present inventor has discovered that in some cases the addition of small amounts of alkylene oxides, such as ethylene oxide, propylene oxide, and butylene oxide to vinyl polymers dramatically improves the performance of lower concentrations of vinyl polymers. Furthermore, the present inventor has discovered that alkoxylated vinyl polymers containing as little as 5% ethylene oxide worked well as a demulsifier in selected crude oils. The present inventor has found that alkoxylated vinyl polymers may be used in place of traditional resin or alkylene oxide demulsifiers, thereby substantially reducing the necessary oxide concentrations without affecting its emulsion breaking capability.

U.S. Pat. Nos. 4,626,379 (Buriks et al.), issued Dec. 2, 1986, and 4,582,628 (Buriks et al.), issued Apr. 15, 1986, demonstrate various types of vinyl polymers now in use. Burkis '379 discloses a demulsifier which comprises the partially condensed reaction product of a blend of at least two oxyalkylated materials with a vinyl monomer. Such oxyalkylated materials are for example polyoxyalkylene glycols, oxyalkylated phenolic resins, and oxyalkylated polyamines. The vinyl monomers which may be used in Burkis '379 include acrylic and methacrylic acids and their esters, vinyl esters such as vinyl formate, vinyl acetate, vinyl propionate and the like, acrylonitrile, styrene and other vinyl aromatics, vinyl pyridine, vinyl pyrrolidone, acrylamide, maleic anhydride and its esters and half esters, and the like.

Burkis '628 discloses a vinyl-type inter-polymer having an overall carbon/oxygen atom ratio of about 2 to 4, which is preferably derived from two types of vinyl monomers: (1) at least one vinyl-type monomer present in the inter-polymer at about 50 mole % or greater and having a carbon/oxygen atom ratio of about 3 or less ("hydrophilic" monomer); and (2) at least one vinyl-type monomer present in the inter-polymer at about 50 mole % or less and having a carbon/oxygen atom ratio of about 3 or more ("hydrophobic" monomer). Typical examples are vinyl acetate/vinyl fatty ester copolymers and vinyl acetate/dialkyl maleate copolymers.

Other conventional demulsifiers are set forth in U.S. Pat. No. 4,678,599 (Fock et al.), issued Jul. 7, 1987. Fock et al. disclose various demulsifiers formed by copolymerizing one or several polyoxyalkylene ether(s) of allyl and/or methallyl alcohol with vinyl esters of lower carboxylic acids or mixtures of vinyl esters of lower carboxylic acids with up to 50 mole percent of esters or acrylic or methacrylic acid or ethers of allyl or methallyl alcohol and fatty alcohols, the quotient of the average molecular weight of the polyoxyalkylene ethers corresponding to their molar fraction and the number of moles of the compounds to be copolymerized being 20 to 200.

The present invention overcomes the many disadvantages of the aforementioned oxyalkylated demulsifiers and vinyl polymer demulsifiers, i.e., cost of ethylene oxide and increased vinyl polymer concentrations. The alkoxylated vinyl polymer demulsifiers of the present invention provide the following advantages: (1) relatively simple chemistry; (2) improved product performance; (3) synergistic effects when blended with some conventional emulsion breakers; (4) improvement in performance over non-alkoxylated vinyl polymers; and (5) since alkoxylated vinyl polymers are not totally dependent on ethylene oxide, it would be substantially insulated from price increases due to ethylene oxide which is not the case for oxyalkylated materials.

Additional advantages of the present invention shall become apparent as described below.

SUMMARY OF THE INVENTION

A demulsifier comprising: a vinyl polymer with a site capable of being alkoxylated; and at least one alkylene oxide selected from the group consisting of: ethylene oxide, propylene oxide, butylene oxide, and the like. The vinyl polymers must have active sites which will react with the alkylene oxides. Groups with labile hydrogen atoms, such as the hydroxyl group (—OH), are often used as alkoxylation sites.

The vinyl polymers have the general structure:

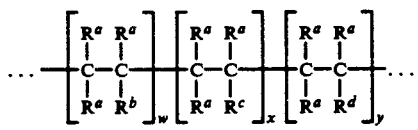

where

Rᵃ is either hydrogen, methyl, or an alkyl group having the general formula $C_nH_{2n+1}$, where n is zero or an integer greater than or equal to one;

Rᵇ, Rᶜ, and Rᵈ represent various functional groups consisting of hydrogen, carbon, and at least one heteroatom, provided that at least one of Rᵇ, Rᶜ, or Rᵈ possesses a site for alkoxylation, wherein the functional groups include those of the structure:

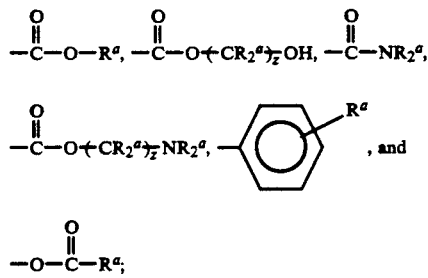

w, x, and y are zero or integers greater than or equal to one, provided that any two of w, x, and y have values greater than or equal to one, and provided that when the functional group Rᵇ, Rᶜ, or Rᵈ contains a site for alkoxylation that the respective w, x, or y cannot be zero; and z is an integer greater than or equal to one.

The process in accordance with the present invention for making an alkoxylated vinyl polymer demulsifier comprising: polymerizing vinyl monomers in the presence of an initiator to form a vinyl polymer having a site capable of being alkoxylated; and following the polymerization step by reacting the polymerized vinyl polymer with at least one alkylene oxide selected from the group consisting of: ethylene oxide, propylene oxide, butylene oxide, and the like. It is conceivable that the polymer could be esterified with block polymers of such oxides, rather than reacted with the individual oxide monomers.

An additional object of the present invention is the formation of a demulsifier containing blends of alkoxylated vinyl polymers, non-alkoxylated vinyl polymers, oxyalkylated demulsifiers, and inorganic demulsifiers.

The present invention may also include many additional features which shall be further described below.

DESCRIPTION OF THE PREFERRED EMBODIMENTS

The present invention provides a novel demulsifier, especially for use in breaking water-in-oil emulsions. Three major industries produce oily waste and waste oil emulsions: petroleum production and refining, metals manufacturing and machining, and food processing. The demulsifier of the present invention is particularly effective in breaking crude oil emulsions.

This demulsifier comprises a vinyl polymer having a site capable of being alkoxylated; and at least one alkylene oxide selected from the group consisting of: ethylene oxide, propylene oxide, butylene oxide, and the like. The vinyl polymer having the general structure:

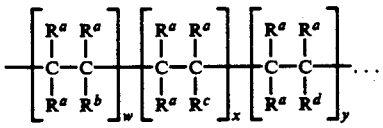

where

Rᵃ is either hydrogen, methyl, or an alkyl group having the general formula $C_nH_{2n+1}$, where n is zero or an integer greater than or equal to one;

Rᵇ, Rᶜ, and Rᵈ represent various functional groups consisting of hydrogen, carbon, and at least one heteroatom, provided that at least one of Rᵇ, Rᶜ, or Rᵈ possesses a site for alkoxylation, wherein the functional groups include those of the structure:

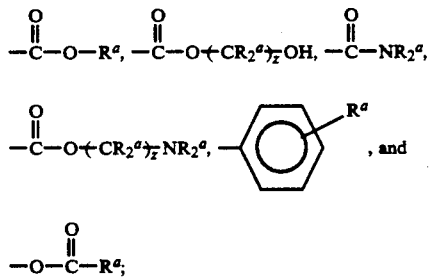

w, x, and y are zero or intergers greater than or equal to one, provided that any two of w, x, and y have values greater than or equal to one, and provided that when the functional group Rᵇ, Rᶜ, or Rᵈ contains a site for alkoxylation that the respective w, x, or y cannot be zero; and z is an integer greater than or equal to one.

The vinyl polymer typically contains a hydrophobic monomer(s) and a hydrophilic monomer(s), one or both of which contain sites which are capable of being alkoxylated.

In addition to carbon, hydrogen, and oxygen, monomers may contain heteroatoms, such as nitrogen, sulfur, and phosphorus. Hence, monomers and polymers will be discussed in terms of the weight percent of the heteroatoms (PHA) rather than the usual carbon-to-oxygen ratio (C/O). For example, a molecule of dimethylaminoethyl acrylate has the formula $C_7H_{13}O_2N$ and an estimated molecular weight of 143. The weight percent attributable to oxygen (2 atoms of atomic weight 16) and nitrogen (1 atom of atomic weight 14) is $(46/143) \times 100 = 32.2\%$, such that its PHA = 32.2.

Similarly, monomers and polymers may be described in terms of the weight percent of hydrogen bonding moieties present, i.e., PHB. A hydrogen bonding moiety is taken to mean a functional portion of a compound that has a labile hydrogen atom attached to a heteroatom, is capable of participating in hydrogen bonding interactions, and can serve as an alkoxylation site. For example, a molecule of hydroxyethyl acrylate has the formula $C_5H_8O_3$ (molecular weight 116) and one hydroxyl group, i.e., —OH, (molecular weight 117). The PHB value for hydroxyethyl acrylate is therefore $(17/116) \times 100 = 14.7$.

For the purpose of this discussion, a hydrophobic monomer is one for which PHA is less than about 27, and a hydrophilic monomer is one for which PHA is greater than or equal to about 27. For example, hydrophobic monomers include butyl acrylate, styrene, decyl acrylate, and lauryl acrylate. Hydrophilic monomers include compounds such as hydroxyethyl acrylate, hydroxyethyl methacrylate, hydropropyl acrylate, hydropropyl methacrylate, methyl methacrylate, acrylamide, methoxyethyl acrylate, vinyl pyrrolidone, acrylic acid, maleic anhydride, methacrylic acid, vinyl pyridine, and vinyl acetate.

The vinyl polymer is preferably at least one compound selected from the group consisting of: butyl acrylate (BA)/hydroxyethyl acrylate (HEA) copolymers; butyl acrylate (BA)/hydroxyethyl acrylate (HEA)/methyl methacrylate (MMA) terpolymers; butyl acrylate (BA)/hydroxyethyl methacrylate (HEMA) copolymers; butyl acrylate (BA)/hydroxyethyl methacrylate (HEMA)/decyl acrylate (DA) terpolymers; butyl acrylate (BA)/hydroxyethyl acrylate (HEA)/lauryl acrylate (LA) terpolymers; and butyl acrylate (BA)/hydroxyethyl methacrylate (HEMA)/lauryl acrylate (LA) terpolymers.

Polymer PHA and PHB values can be easily calculated from the following equations:

$$PHA_{polymer} = w_1 PHA_1 + w_2 PHA_2 + \quad (1)$$

$$PHB_{polymer} = w_1 PHB_1 + w_2 PHB_2 + \quad (2)$$

where "1" and "2" denote monomers comprising the polymer and "w" refers to the weight fraction.

It is preferred that the vinyl polymer used in accordance with the present invention have a PHA (weight percent heteroatom) in the range between about 14 to about 34; more preferably in the range between about 16 to about 29.

When crude oil, such as Black Minnelusa from Wyoming, is being demulsified, the following demulsifiers are preferred: a copolymer of butyl acrylate(BA)/hydroxyethyl methacrylate(HEMA) having a molar ratio of about 93:7, respectively, with ethylene oxide present in an amount between about 7-13 weight percent; a terpolymer of butyl acrylate(BA)/hydroxyethyl acrylate(HEA)/methyl methacrylate(MMA) having a molar ratio of about 93:5:2, respectively, with ethylene oxide present in an amount between about 0-15 weight percent, and/or propylene oxide present in an amount between about 7-15 weight percent; a terpolymer of butyl acrylate(BA)/hydroxyethyl methacrylate(HEMA)/decyl acrylate (DA), with ethylene oxide present in an amount between about 5-40 weight percent; and a copolymer of butyl acrylate(BA)/hydroxyethyl methacrylate(HEMA), with propylene oxide present in an amount between about 5-40 weight percent.

The demulsifiers of the present invention may contain ethylene oxide in an amount between about 1 to 90 weight percent and/or propylene oxide in an amount between about 1 to 90 weight percent. Preferably in amounts between about 2 to 40 for ethylene oxide and/or propylene oxide. More preferably is a demulsifier containing about 1 to 15 percent of ethylene oxide and about 1 to 20 percent propylene oxide.

It is also envisioned that the demulsifier in accordance with the present invention may include blends of alkoxylated vinyl polymers, non-alkoxylated vinyl polymers, oxyalkylated demulsifiers, and inorganic demulsifiers. Also, crosslinking agents are often employed to improve emulsion breaker performance. It is therefore conceivable that the demulsifiers of the present invention may be enhanced by the use of crosslinking agents, such as diepoxides or polyfunctional vinyl monomers.

The preferred process for making alkoxylated vinyl polymers involves placing vinyl polymer in an autoclave (i.e., an apparatus for reactions which require high temperature and/or pressure) with an initiator and heating to 70°-160° C. The polymerized vinyl polymer is thereafter reacted with the desired alkylene oxide, i.e., ethylene oxide, propylene oxide, butylene oxide, and/or the like. It should be noted that the alkoxylation step follows the polymerization of the vinyl monomers, i.e., it is the polymer itself, rather than the monomer, which is being alkoxylated.

It is also conceivable that demulsifiers may be prepared via a process in which the alkoxylation step precedes the free radical polymerization step. In such a case, alkoxylated vinyl monomers would be polymerized through a free radical process to produce the desired alkoxylated vinyl polymer.

The following examples were developed using the so-called "bottle test" described in "Treating Oil Field Emulsions", American Petroleum Institute, 3rd Edition, 1974. Of particular interest are the rate at which the water separates or drops (WD) from the oil phase and the extent to which the oil phase is dehydrated or treated (TRT). The bottle tests typically were run at 130°-140° F. with cold and hot agitations of three minutes duration and of mild intensity. Demulsifier concentrations ranged from 30 to 120 ppm. The testing times were approximately three hours.

EXAMPLE 1

A terpolymer of butyl acrylate (BA)/hydroxyethyl acrylate (HEA)/methyl methacrylate (MMA) having a molar ratio of 93:5:2, respectively, was mixed with varying weight percents of propylene oxide(PO) and/or ethylene oxide(EO) to determine its performance as a crude oil demulsifier. The results are set forth below in Table 1.

TABLE 1

| Vinyl Polymer | % PO | % EO | Performance |
|---|---|---|---|
| BA/HEA/MMA | 0 | 0 | poor |
| BA/HEA/MMA | 7 | 0 | good |
| BA/HEA/MMA | 15 | 6 | good |
| BA/HEA/MMA | 14 | 9 | excellent |
| BA/HEA/MMA | 13 | 15 | excellent |

The vinyl polymer defined above had poor demulsification performance prior to alkoxylation. The data demonstrates that the addition of small percents of oxides can in fact produce an excellent demulsifier. The alkoxylated vinyl polymer proved to be a much better demulsifier than did the non-alkoxylated vinyl polymer.

EXAMPLE 2

A copolymer of butyl acrylate (BA)/hydroxyethyl acrylate(HEA) having a molar ratio of about 93:7 was reacted with ethylene oxide of varying amounts, i.e., 0, 2, 4, and 13 weight percents. The ethoxylated vinyl polymer performed best as a demulsifier when ethylene oxide was present in amounts greater than 4% by weight. Poor performance was recorded when ethylene oxide was present in amounts of 0-2% by weight.

EXAMPLE 3

Evaluation of emulsion breaking performance was based on two variables: (1) water coalescence rate or water drop(WD) rate; and (2) completeness of dehydration of the oil phase or treat(TRT).

Based on the bottle test results, demulsifier performance was rated on a scale of 0 to 4, wherein the higher numbers represented better performance. Performance values for alkoxylated vinyl polymers are set forth in Table 2. The term "ACCEPTOR" refers to a vinyl polymer molecule prior to the alkoxylation step. For example, the second compound listed in Table 2 below was synthesized by the reaction of 98 parts vinyl polymer, having a PHA=25.7 and a PHB=0.7, and 2 parts ethylene oxide.

TABLE 2

[ALKOXYLATED VINYL POLYMER DEMULSIFIERS]

| POLYMER COMPOSITION | % PO | % EO | % PO | WD | TRT | ACCEPTOR PHA | PHB |
|---|---|---|---|---|---|---|---|
| BA/HEA | 0 | 0 | 0 | 0 | 1 | 25.7 | 0.7 |
| BA/HEA | 2 | 0 | 0 | 0 | 1 | 25.7 | 0.7 |
| BA/HEA | 4 | 0 | 0 | 0 | 2 | 25.7 | 0.7 |
| BA/HEA | 13 | 0 | 0 | 0 | 4 | 25.7 | 0.7 |
| BA/HEA | 12 | 13 | | 1 | 4 | 25.7 | 0.7 |
| BA/HEA | | 0 | | 2 | 1 | 26.2 | 1.1 |
| BA/HEA | | 3 | | 2 | 2 | 26.2 | 1.1 |
| BA/HEA | | 9 | | 2 | 4 | 26.2 | 1.1 |
| BA/HEA | | 0 | | 3 | 1 | 26.4 | 1.3 |
| BA/HEA | 7 | | | 2 | 3 | 26.4 | 1.3 |
| BA/HEA | 12 | | | 3 | 2 | 26.4 | 1.3 |
| BA/HEA | | 0 | | 1 | 1 | 25.7 | 0.7 |
| BA/HEA | | 2 | | 1 | 2 | 25.7 | 0.7 |
| BA/HEA | | 7 | | 1 | 3 | 25.7 | 0.7 |
| BA/HEA/MMA | 0 | 0 | 0 | 3 | 1 | 25.9 | 0.7 |
| BA/HEA/MMA | 7 | 0 | 0 | 3 | 3 | 25.9 | 0.7 |
| BA/HEA/MMA | 15 | 6 | 0 | 3 | 3 | 25.9 | 0.7 |
| BA/HEA/MMA | 14 | 9 | 0 | 3 | 4 | 25.9 | 0.7 |
| BA/HEA/MMA | 13 | 15 | 0 | 3 | 4 | 25.9 | 0.7 |
| BA/HEA/MMA | 12 | 15 | 6 | 3 | 4 | 25.9 | 0.7 |
| BA/HEA/MMA | | 0 | 0 | 1 | 1 | 26.4 | 1.1 |
| BA/HEA/MMA | | 2 | 0 | 2 | 2 | 26.4 | 1.1 |
| BA/HEA/MMA | | 5 | 0 | 2 | 4 | 26.4 | 1.1 |
| BA/HEA/MMA | | 14 | 0 | 1 | 1 | 26.4 | 1.1 |
| BA/HEA/MMA | | 20 | 2 | 1 | 1 | 26.4 | 1.1 |
| BA/HEA/MMA | | 19 | 7 | 1 | 1 | 26.4 | 1.1 |
| BA/HEA/MMA | | 0 | 0 | 1 | 1 | 26.4 | 1.1 |
| BA/HEA/MMA | | 6 | 0 | 1 | 3 | 26.4 | 1.1 |
| BA/HEA/MMA | | 16 | 5 | 1 | 3 | 26.4 | 1.1 |
| BA/HEA/MMA | | 13 | 21 | 2 | 2 | 26.4 | 1.1 |
| BA/HEA/MMA | | 0 | | 2 | 1 | 27.6 | 2.1 |
| BA/HEA/MMA | | 6 | | 3 | 1 | 27.6 | 2.1 |
| BA/HEA/MMA | | 12 | | 3 | 1 | 27.6 | 2.1 |
| BA/HEA/MMA | | 16 | | 2 | 1 | 27.6 | 2.1 |
| BA/HEMA | | 0 | | 4 | 2 | 26.3 | 1.5 |
| BA/HEMA | | 5 | | 4 | 2 | 26.3 | 1.5 |
| BA/HEMA | | 10 | | 4 | 2 | 26.3 | 1.5 |
| BA/HEMA | | 15 | | 4 | 2 | 26.3 | 1.5 |
| BA/HEMA | | 20 | | 4 | 2 | 26.3 | 1.5 |
| BA/HEMA | | 25 | | 4 | 2 | 26.3 | 1.5 |
| BA/HEMA | | 30 | | 4 | 2 | 26.3 | 1.5 |
| BA/HEMA | | 35 | | 4 | 2 | 26.3 | 1.5 |
| BA/HEMA | | 40 | | 4 | 2 | 26.3 | 1.5 |
| BA/HEMA | | 50 | | 1 | 1 | 26.3 | 1.5 |
| BA/HEMA/DA | 0 | | | N/A | N/A | 24.0 | 1.2 |
| BA/HEMA/DA | 5 | | | 4 | 4 | 24.0 | 1.2 |
| BA/HEMA/DA | 10 | | | 4 | 4 | 24.0 | 1.2 |
| BA/HEMA/DA | 15 | | | 4 | 4 | 24.0 | 1.2 |
| BA/HEMA/DA | 20 | | | 4 | 4 | 24.0 | 1.2 |
| BA/HEMA/DA | 30 | | | 4 | 4 | 24.0 | 1.2 |
| BA/HEMA/DA | 40 | | | 4 | 4 | 24.0 | 1.2 |
| BA/HEMA/LA | 0 | | | N/A | N/A | 21.5 | 1.3 |
| BA/HEMA/LA | 5 | | | 3 | 3 | 21.5 | 1.3 |
| BA/HEMA/LA | 10 | | | 3 | 3 | 21.5 | 1.3 |
| BA/HEMA/LA | 15 | | | 3 | 3 | 21.5 | 1.3 |

TABLE 2-continued

[ALKOXYLATED VINYL POLYMER DEMULSIFIERS]

| POLYMER COMPOSITION | % PO | % EO | % PO | WD | TRT | ACCEPTOR PHA | PHB |
|---|---|---|---|---|---|---|---|
| BA/HEMA/LA | 20 | | | 3 | 3 | 21.5 | 1.3 |
| BA/HEMA/LA | 25 | | | 1 | 4 | 21.5 | 1.3 |
| BA/HEMA/LA | 30 | | | 1 | 4 | 21.5 | 1.3 |
| BA/HEMA/LA | 35 | | | 1 | 4 | 21.5 | 1.3 |
| BA/HEMA/LA | 40 | | | 1 | 4 | 21.5 | 1.3 |
| BA/HEMA/LA | 45 | | | 1 | 3 | 21.5 | 1.3 |
| BA/HEA/LA | | 0 | | 3 | 2 | 26.4 | 1.6 |
| BA/HEA/LA | | 3 | | 2 | 2 | 26.4 | 1.6 |
| BA/HEA/LA | | 9 | | 2 | 2 | 26.4 | 1.6 |

A number of alkoxylated vinyl polymers demonstrated substantial demulsification ability on crude oil emulsions. The BA/HEA copolymers with PHA=25.7 and PHB=0.7 dehydrated poorly(TRT=1), while BA/HEA copolymers with 7-13% ethylene oxide(EO) improved the TRT values from 1 to 3-4. Similarly, addition of 5-7% ethylene oxide or propylene oxide to the terpolymers of BA/HEA/MMA with PHA values between 25.9-26.4 significantly improved the dehydration performance over the non-alkoxylated vinyl polymers.

Performance is not necessarily a function of oxide, i.e., a little oxide may have the same effect as a large amount of oxide. For example, all members of the BA/HEMA/DA ethoxylate series tested very well, yielding WD and TRT values of 4. The weight percent of ethylene oxide for this series ranged from 5 to 40%. As is sometimes the case, the performance of the polymers with low oxide content was not substantially different from those with high oxide content.

Members of the BA/HEMA/DA ethoxylate series in the 5-40% ethylene oxide range and the BA/HEMA series in the 5-40% propylene oxide range proved to be excellent water droppers. The ethoxylate series also dehydrated the crude oil very well. Similarly, most alkoxylated vinyl polymers also tested well as treaters.

Some of the best alkoxylated vinyl polymers tested in this Example 3 are set forth below in Table 3.

TABLE 3

[SELECTED ALKOXYLATED VINYL POLYMERS]

| POLYMER COMPOSITION | ACCEPTOR PHA | PHB | PROMINENT PERFORMANCE | % PO | % EO |
|---|---|---|---|---|---|
| BA/HEMA/DA | 24.0 | 1.2 | water drop | | 5 |
| BA/HEMA | 26.3 | 1.5 | water drop | 5 | |
| BA/HEMA | 26.3 | 1.5 | water drop | 30 | |
| BA/HEMA/DA | 24.0 | 1.2 | treat | | 5 |
| BA/HEA/MMA | 25.9 | 0.7 | treat | 13 | 15 |
| BA/HEMA/LA | 21.5 | 1.3 | treat | | 30 |
| BA/HEA | 25.7 | 0.7 | treat | | 13 |
| BA/HEA | 26.2 | 1.1 | treat | | 9 |
| BA/HEA/MMA | 26.4 | 1.1 | treat | | 5 |

While I have shown and described several embodiments in accordance with my invention, it is to be clearly understood that the same are susceptible to numerous changes and modifications apparent to one skilled in the art. Therefore, I do not wish to be limited to the details shown and described, but intend to show all changes and modifications which come within the scope of the appended claims.

What is claimed is:

1. A process for making an alkoxylated vinyl polymer comprising:

polymerizing at least one hydrophobic monomer selected from the group consisting of butyl acrylate, decyl acrylate, and lauryl acrylate, and at least one hydrophilic monomer selected from the group consisting of hydroxyethyl acrylate, hydroxyethyl methacrylate and methyl methacrylate in the presence of an initiator at an elevated temperature in the range between about 70°–160° C. to form a vinyl polymer; wherein said vinyl polymer is at least one compound selected from the group consisting of: butyl acrylate/hydroxyethyl acrylate copolymers; butyl acrylate/hydroxyethyl acrylate/methyl methacrylate terpolymers; butyl acrylate/hydroxyethyl methacrylate copolymers; butyl acrylate/hydroxyethyl methacrylate/decyl acrylate terpolymers; butyl acrylate/hydroxyethyl acrylate/lauryl acrylate terpolymers; and butyl acrylate/hydroxyethyl methacrylate/lauryl acrylate terpolymers; and alkoxylating said vinyl polymer with at least one alkylene oxide selected from the group consisting of ethylene oxide, propylene oxide and butylene oxide; said alkylene oxide being present in an amount between about 2–40%.

2. The process according to claim 1, wherein said vinyl polymer has a weight percent heteroatom (PHA) before alkoxylation in the range between about 14 to about 34.

3. The process according to claim 2, wherein said vinyl polymer has a weight percent heteroatom (PHA) before alkoxylation in the range between about 16 to about 29.

4. The process according to claim 1, wherein said alkoxylated vinyl polymer is an alkoxylated copolymer of butyl acrylate/hydroxyethyl methacrylate having a molar ratio of about 93:7, respectively, with ethylene oxide present in an amount between about 7–13 weight percent.

5. The process according to claim 1, wherein said alkoxylated vinyl polymer is an alkoxylated terpolymer of butyl acrylate/hydroxyethyl acrylate/methyl methacrylate having a molar ratio of about 93:5:2, respectively, with ethylene oxide present in an amount between about 0–15 weight percent, and/or propylene oxide present in an amount between about 7–15 weight percent.

6. The process according to claim 1, wherein said alkoxylated vinyl polymer is an alkoxylated terpolymer of butyl acrylate/hydroxyethyl methacrylate/decyl acrylate, with ethylene oxide present in the range between about 5–40 weight percent.

7. The process according to claim 1, wherein said alkoxylated vinyl polymer is an alkoxylated copolymer of butyl acrylate/hydroxyethyl methacrylate, with propylene oxide present in the range between about 5–40 weight percent.

* * * * *